United States Patent
Hiemenz et al.

(10) Patent No.: US 9,625,574 B2
(45) Date of Patent: Apr. 18, 2017

(54) CONSTANT PULSE REPETITION FREQUENCY TECHNIQUES FOR ELIMINATING SECOND TIME AROUND RETURNS IN PULSED DOPPLER RADAR

(71) Applicant: SRC, Inc., North Syracuse, NY (US)

(72) Inventors: Robert E. Hiemenz, Liverpool, NY (US); Daniel D. Thomas, Jr., Baldwinsville, NY (US)

(73) Assignee: SRC, INC., North Syracuse, NY (US)

( * ) Notice: Subject to any disclaimer, the term of this patent is extended or adjusted under 35 U.S.C. 154(b) by 559 days.

(21) Appl. No.: 14/175,517

(22) Filed: Feb. 7, 2014

(65) Prior Publication Data

US 2016/0061937 A1     Mar. 3, 2016

Related U.S. Application Data

(60) Provisional application No. 61/761,888, filed on Feb. 7, 2013.

(51) Int. Cl.
*G01S 7/292* (2006.01)
*G01S 13/20* (2006.01)
*G01S 13/28* (2006.01)
*G01S 13/58* (2006.01)

(52) U.S. Cl.
CPC ............ *G01S 13/20* (2013.01); *G01S 13/282* (2013.01); *G01S 13/582* (2013.01)

(58) Field of Classification Search
CPC ....... G01S 13/20; G01S 13/282; G01S 13/582
USPC .......................................................... 342/90
See application file for complete search history.

(56) References Cited

U.S. PATENT DOCUMENTS

| | | | |
|---|---|---|---|
| 4,427,982 A | 1/1984 | Caprio | |
| 4,890,113 A | 12/1989 | Jacomini | |
| 5,079,556 A | 1/1992 | Itoh | |
| 5,150,125 A * | 9/1992 | Hager | G01S 13/20 |
| | | | 342/120 |
| 5,311,183 A | 5/1994 | Mathews | |
| 5,442,359 A | 8/1995 | Rubin | |
| 5,726,657 A | 3/1998 | Pergande | |
| 6,225,943 B1 | 5/2001 | Curley | |
| 7,492,309 B2 | 2/2009 | Hurst | |
| 7,626,535 B2 | 12/2009 | Ding | |
| 7,741,992 B2 | 6/2010 | Wang | |

FOREIGN PATENT DOCUMENTS

JP         4009786          1/1992

OTHER PUBLICATIONS

Isoda, K., Hara, T., Doppler Velocity Measurement Method with a Second-Time-Around Echoes Suppression for Synthetic Bandwidth Radars, Oct. 2011, pp. 134-137.

* cited by examiner

*Primary Examiner* — Timothy A Brainard
(74) *Attorney, Agent, or Firm* — George R. McGuire; Frederick J M Price; Bond, Schoeneck & King, PLLC

(57) ABSTRACT

The present invention relates to a method and system for identifying and eliminating second time-around ambiguous targets and, more particularly, to a method and system for identifying and eliminating second time-around ambiguous targets using waveform phase modulation.

20 Claims, 7 Drawing Sheets

US 9,625,574 B2

CONSTANT PULSE REPETITION FREQUENCY TECHNIQUES FOR ELIMINATING SECOND TIME AROUND RETURNS IN PULSED DOPPLER RADAR

RELATED APPLICATION DATA

The present application claims the benefit of U.S. provisional patent application No. 61/761,888, filed Feb. 7, 2013, and is hereby incorporated by reference in its entirety.

BACKGROUND OF THE INVENTION

1. Field of the Invention

The present invention relates to a method and system for identifying and eliminating second time-around ambiguous targets and, more particularly, to a method and system for identifying and eliminating second time-around ambiguous targets using waveform phase modulation.

2. Description of the Related Art

Conventional pulse-Doppler radar systems, target detection through the use of pulse-Doppler radar systems, and pulse-Doppler signal processing used to extract information related to detected targets are known and should be appreciated by those skilled in the art.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

The present invention recognizes that there are potential problems and/or disadvantages with conventional pulse-Doppler radar systems. First, target detections from second time-around returns, which refer to targets that reside outside of the radar's maximum instrumented range ("$R_{max}$"), often cause unacceptable performance of the pulse-Doppler radar systems to a user. The targets are processed and displayed as if they belong within the radar's instrumented range (i.e., within the $R_{max}$ range), thus appearing as "ghost images." The classic technique for removing these targets is to vary the pulse repetition frequency ("PRF") for consecutive continuous processing intervals ("CPI"), and eliminate targets that shift in range. However, this classic method is not available for some pulse-Doppler radar systems, because, for example, other processing techniques used by that system may require a constant PRF. Various embodiments of the present invention may be advantageous in that they may solve or reduce one or more of the potential problems and/or disadvantages discussed above.

Various embodiments of the present invention may exhibit one or more of the following objects, features and/or advantages:

It is therefore a principal object and advantage of the present invention to provide an alternative method and system of eliminating second time-around returns for a constant PRF radar.

In accordance with the foregoing principal object and advantage, an embodiment of the present invention is directed to computer implemented method for identifying and eliminating second time-around ambiguous targets that can include, but is not limited to, the steps of: transmitting, by a processor, a first linear FM radar ("LFM") pulse waveform signal and a second LFM pulse waveform signal to at least one target, wherein the first LFM pulse waveform signal and the second LFM pulse waveform signal have alternating phase shifts separated by a predetermined degree; receiving, by the processor, a first return signal from the at least one target in response to the first LFM pulse waveform signal, and a second return signal from the at least one target in response to the second LFM pulse waveform signal; demodulating, by the processor, the received first return signal and the received second return signal; and identifying the at least one target as a second time-around ambiguous target wherein when at least one of the following occurs: the received first return signal is demodulated in the step of demodulating in a phase shift that is offset from the transmitted phase shift of the first LFM pulse waveform signal; or the received second return signal is demodulated in the step of demodulating in a phase shift that is offset from the transmitted phase shift of the second LFM pulse waveform signal.

In accordance with an additional embodiment of the present invention, there is provided a non-transitory computer-readable storage medium containing program code including, but not limited to: program code for transmitting a first linear FM radar ("LFM") pulse waveform signal and a second LFM pulse waveform signal to at least one target, wherein the first LFM pulse waveform signal and the second LFM pulse waveform signal have alternating phase shifts separated by a predetermined degree; program code for receiving a first return signal from the at least one target in response to the first LFM pulse waveform signal, and a second return signal from the at least one target in response to the second LFM pulse waveform signal; program code for demodulating the received first return signal and the received second return signal; program code for identifying the at least one target as a second time-around ambiguous target wherein when at least one of the following occurs: the received first return signal is demodulated in the step of demodulating in a phase shift that is offset from the transmitted phase shift of the first LFM pulse waveform signal; or the received second return signal is demodulated in the step of demodulating in a phase shift that is offset from the transmitted phase shift of the second LFM pulse waveform signal.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
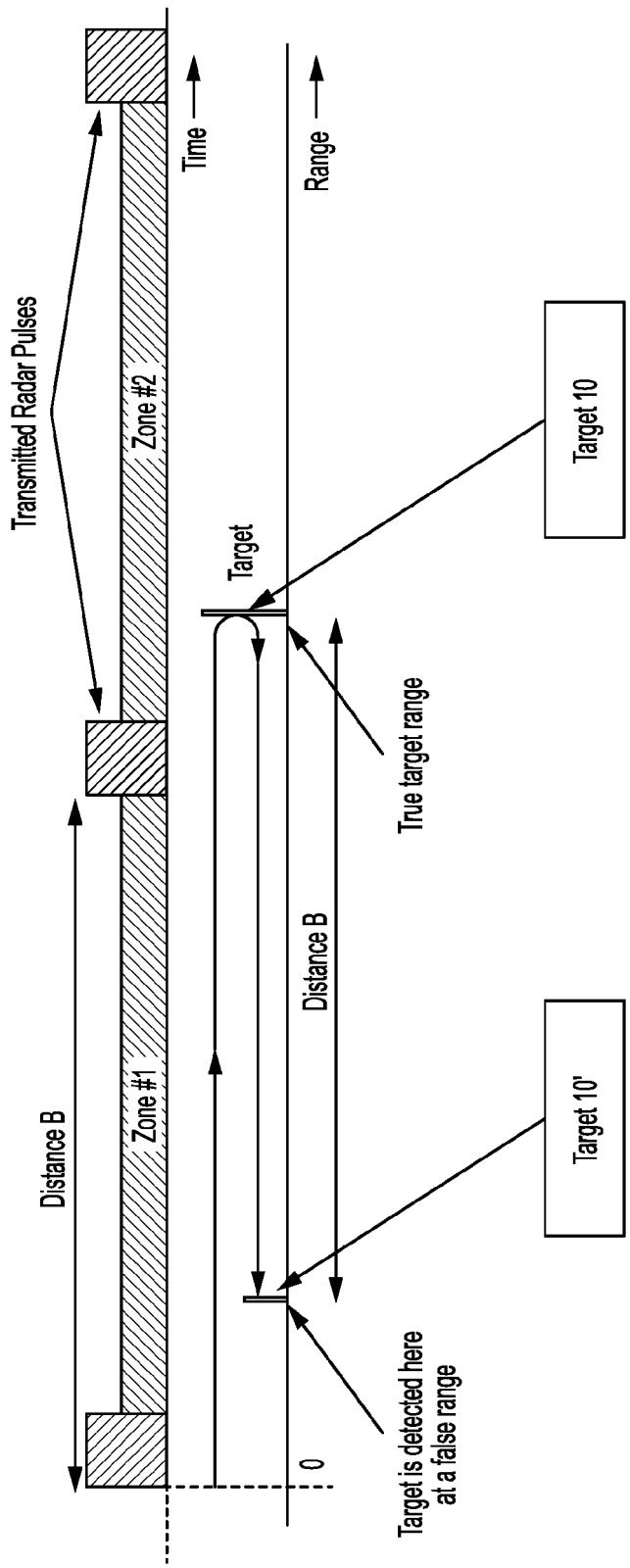
FIG. 1 is a schematic illustration of second time-around returns issue.

The present invention will be more fully understood and appreciated by reading the following Detailed Description in conjunction with the accompanying drawings, wherein like reference numerals (if any) refer to like components.

Turning to FIG. 1, a schematic illustration of second time-around returns issue is shown. In pulse-Doppler radar systems, as noted above, if a target is located within Zone #2 and has a large radar cross-section ("RCS"), for example, the target 10 will be detected and displayed as if its range is in Zone #1 (see FIG. 1, target 10'). Second time-around targets are observed as false targets—e.g., target 10'. A method and system is needed, and is provided for herein, to either cancel out these second time-around targets, or make them identifiable (so that they can preferably be eliminated). As discussed above, some systems cannot utilize traditional methods of identifying second time-around targets for various reasons.

In accordance with an embodiment of the present invention, a pulse-Doppler radar system is provided that is configured, structured, and/or programmed to transmit and decode every other pulse with a different phase in order to identify and eliminate second time-around targets. This can be accomplished by transmitting pulses using linear FM radar ("LFM") pulse waveforms with alternating phase shifts separated by a certain degree (e.g., a second phase is offset from a first phase by 45° for both transmit and referenced waveforms) at an ambiguous reference (i.e., outside of the $R_{max}$ range), and using the same phase shift for an unambiguous target reference (i.e., within the $R_{max}$ range), as appropriate.

Figure 2:
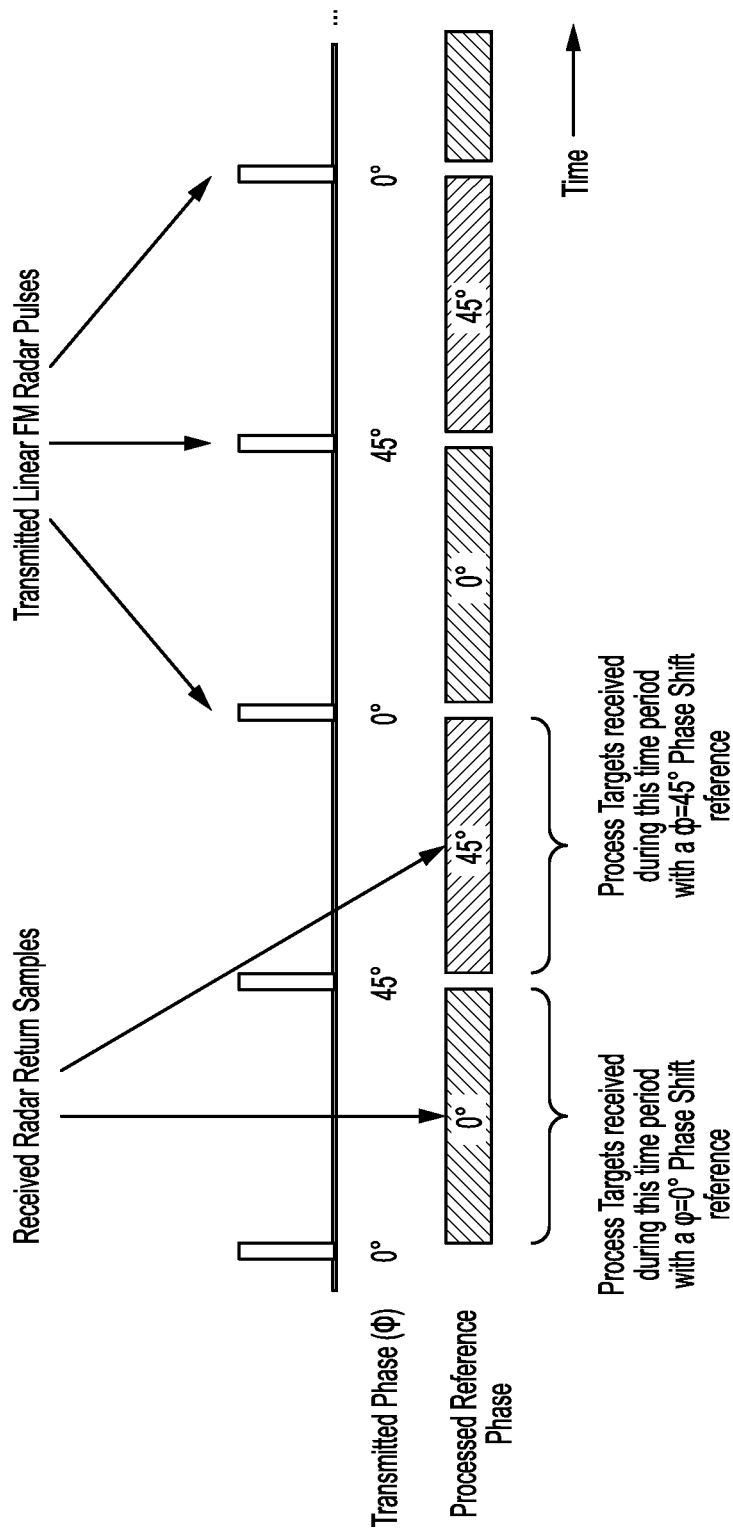
FIG. 2 is schematic illustration of the transmission of pulses using LFM waveforms with alternating phase shifts (e.g., 0° and 45°), and the receipt of radar return samples in a processed referenced phase (e.g., 0° and 45°), according to an embodiment of the present invention.

Turning to FIG. 2, a schematic illustration of the transmission of pulses using LFM waveforms with alternating phase shifts (e.g., 0° and 45° in a "transmitted starting phase"), and the receipt of radar return samples in a processed referenced phase (e.g., 0° and 45°) is shown, in accordance with an embodiment of the present invention.

The LFM waveform used for the modulated waveforms of an embodiment of the present invention can be defined as follows:

$$LFM(t) = \begin{cases} w(t) & \text{for } 0 \le t \le PW \\ 0 & \text{otherwise} \end{cases}$$

$$w(t) = e^{j(2\pi(f_0 + S_c t/2)t + \phi)}$$

Where:

PW → Radar pulsewidth

BW → Transmission $S_c$ → chirp slope    $S_c = BW/PW$ $t$ → time $\phi$ → applied phase offset $f_0$ → starting chirp frequency    $f_0 = -1/2\, BW$ The LFM waveform is created and the returns are processed as shown above. For every target detection found, the Doppler cell ½ D away (and at the same range) from the original should be examined, where D is the full Doppler region. If a response is found at the second Doppler cell that is the same as the original, for example, both responses as second time-around returns should be rejected (see, e.g., FIG. 3A-B). Stated differently, targets that are unambiguous (as defined herein) will decode normally, and targets that are ambiguous (as defined herein) will have a second copy ½ a Doppler window ("D") away. At this point, a software filter can be applied to identify and remove both copies of the ambiguous target results.

Figure 3:
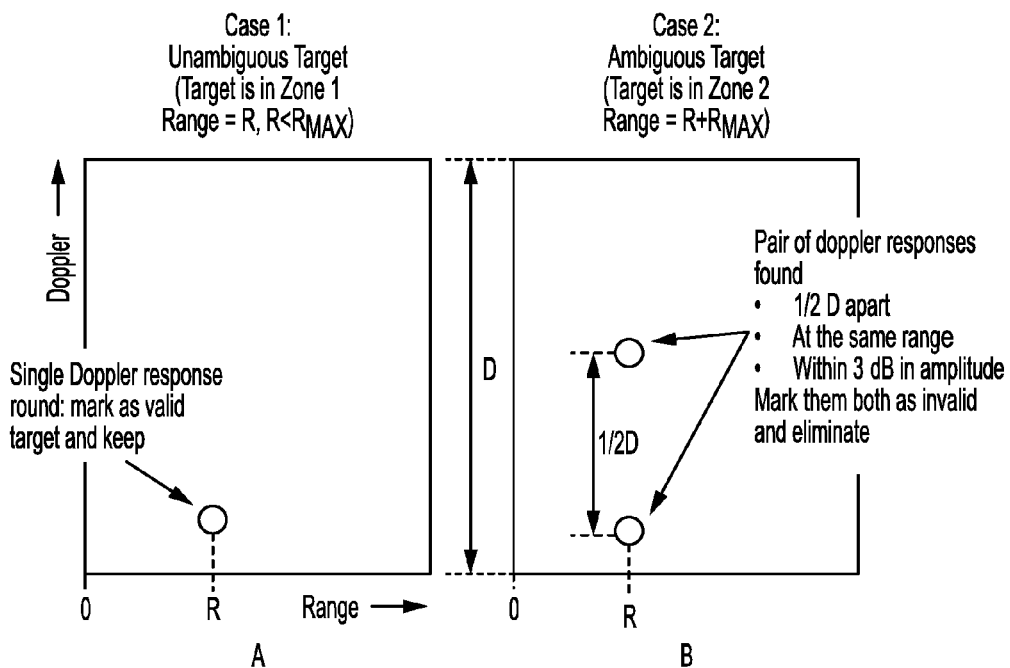
FIG. 3A-B are graphical illustrations of target processing, according to an embodiment of the present invention.

Turning to FIG. 3A-B, a graphical illustration of target processing is shown, according to an embodiment of the present invention. FIG. 3A shows case 1, which shows the detection of an unambiguous target (within Zone No. 1 where Range=R<$R_{max}$). A single Doppler response was found. In this case, this response should be marked as a valid target detection and the result kept. FIG. 3B shows case 2, which shows the detection of an ambiguous target (within Zone No. 2 where Range=R+$R_{max}$). A pair of Doppler responses was found ½ D apart at the same range and at the same amplitude. The range bins should be the same for both Doppler responses. This unique signature can be used to identify the ambiguous target, and this pair of responses can be marked as invalid and eliminated.

Figure 4:
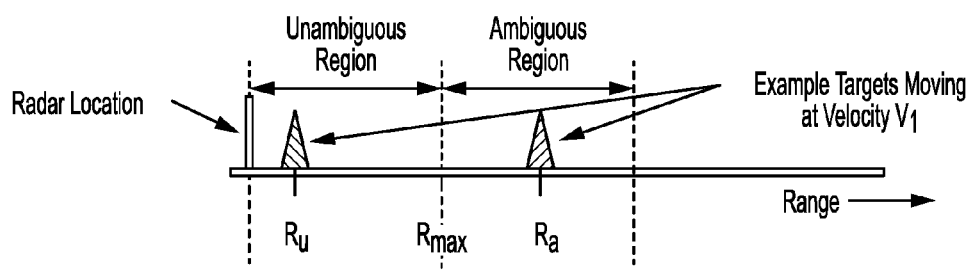
FIG. 4 is a schematic illustration showing a radar location, an unambiguous region with an unambiguous target ($R_u$), $R_{max}$, and an ambiguous region with an ambiguous target ($R_a$).

FIG. 4 is a schematic illustration showing a radar location, an unambiguous region with an unambiguous target ($R_u$), $R_{max}$, and an ambiguous region with an ambiguous target ($R_a$).

Figure 5:
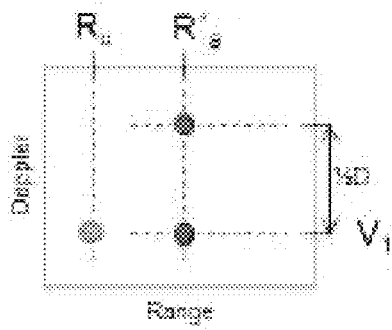
FIG. 5 is a graphical illustration, similar to FIG. 3A-B, which shows the detection of an unambiguous target ($R_u$) and the detection of an ambiguous target ($R'_a$, where $R'_a = R_a - R_{max}$), where any ambiguous target should produce a double response that can be identified and eliminated, according to an embodiment of the present invention.

FIG. 5 is a graphical illustration, similar to FIG. 3A-B, which shows the detection of an unambiguous target ($R_u$) and the detection of an ambiguous target ($R'_a$, where $R'_a = R_a - R_{max}$), where any ambiguous target should produce a double response that can be identified and eliminated, according to an embodiment of the present invention.

Figure 6:
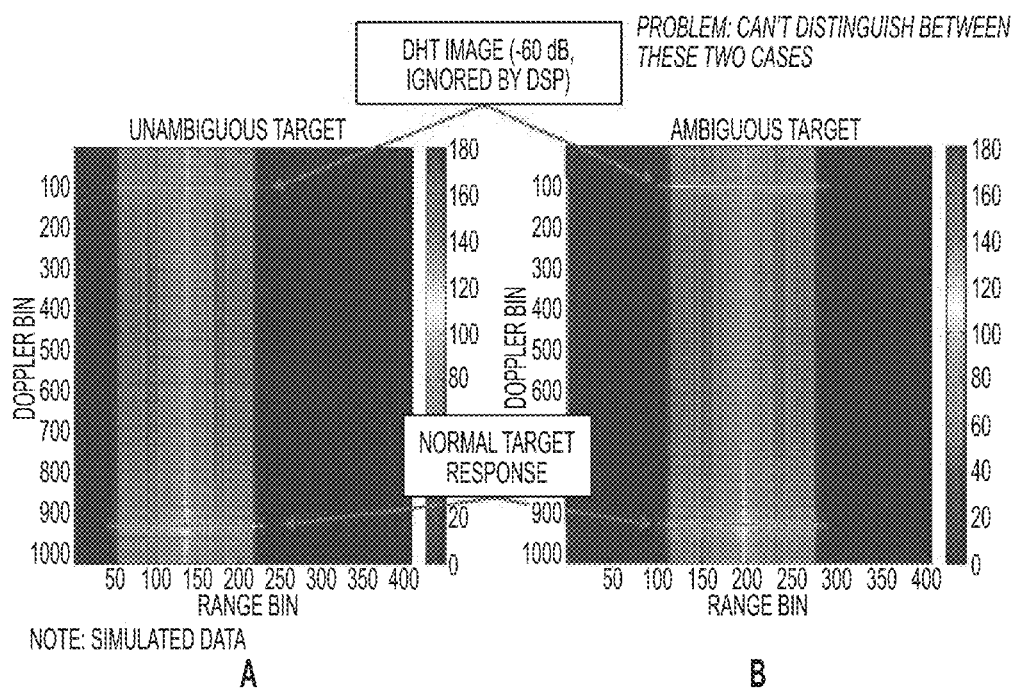
FIG. 6A-B are Range-Doppler images of an unambiguous target and an ambiguous target, respectively, illustrating the use of a single LFM waveform with no alternating phases.

FIG. 6A-B are Range-Doppler images of an unambiguous target and an ambiguous target, respectively, illustrating the use of a single LFM waveform with no alternating phases. The problem illustrated by FIG. 6A-B is that the image in A and B cannot be distinguished.

FIG. 7A-B are Range-Doppler images of an unambiguous target and an ambiguous target, respectively, illustrating the use of LFM waveforms with alternating phase shifts/phase modulation (e.g., 0° and 45°), according to an embodiment of the present invention.

FIG. 8A-C are Range-Doppler images of an ambiguous target as shown in FIG. 7B, with additional response details, according to an embodiment of the present invention.

Figure 7:
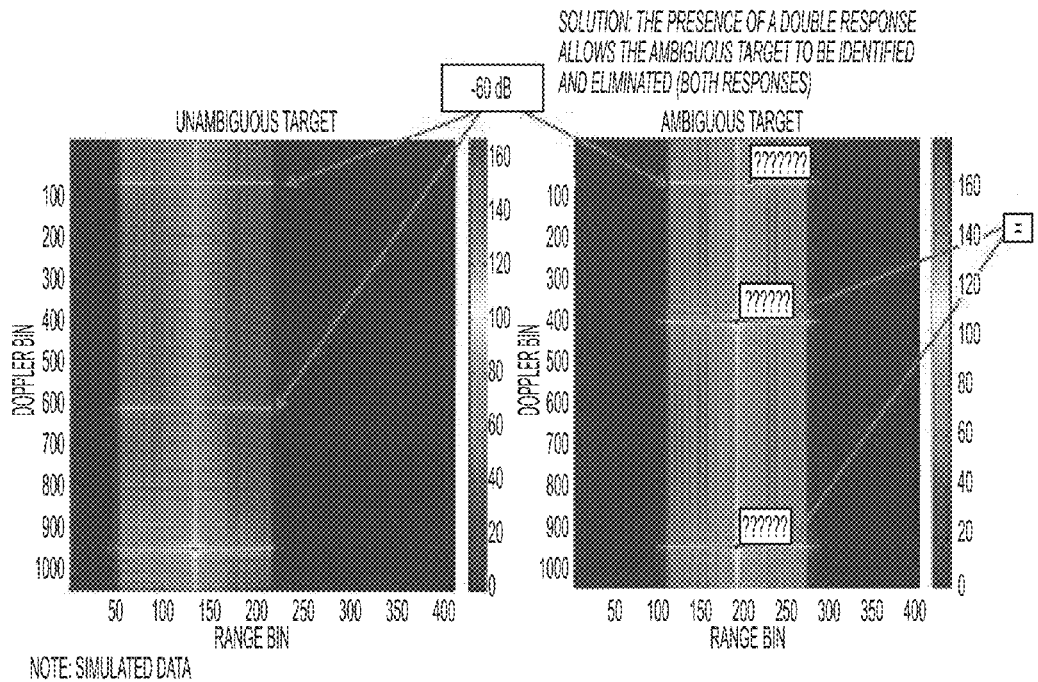
FIG. 7A-B are Range-Doppler images of an unambiguous target and an ambiguous target, respectively, illustrating the use of LFM waveforms with alternating phase shifts/phase modulation (e.g., 0° and 45°), according to an embodiment of the present invention.
Figure 8:
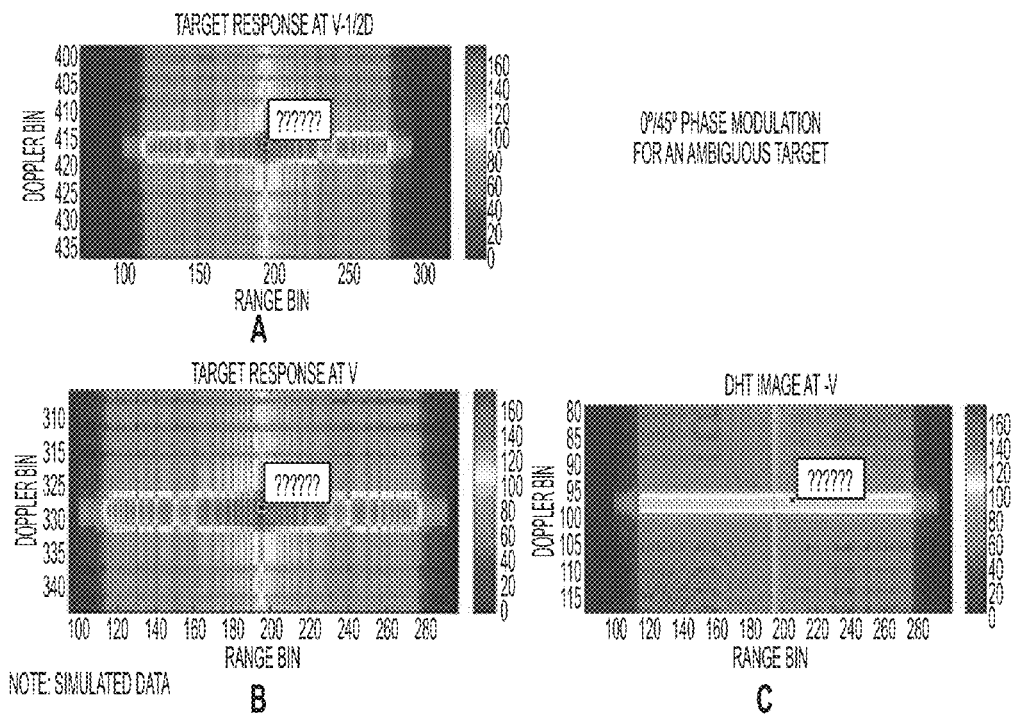
FIG. 8A-C are Range-Doppler images of an ambiguous target as shown in FIG. 7B, with additional response details, according to an embodiment of the present invention.

The simulations shown in FIGS. 7-8 show that a method and system of an embodiment of the present invention as described and shown herein works for its intended purpose. There is no production of artifacts for unambiguous targets, and a means of identifying targets from Zone No. 2 which can later be eliminated in the detection processor is provided.

Figure 9:
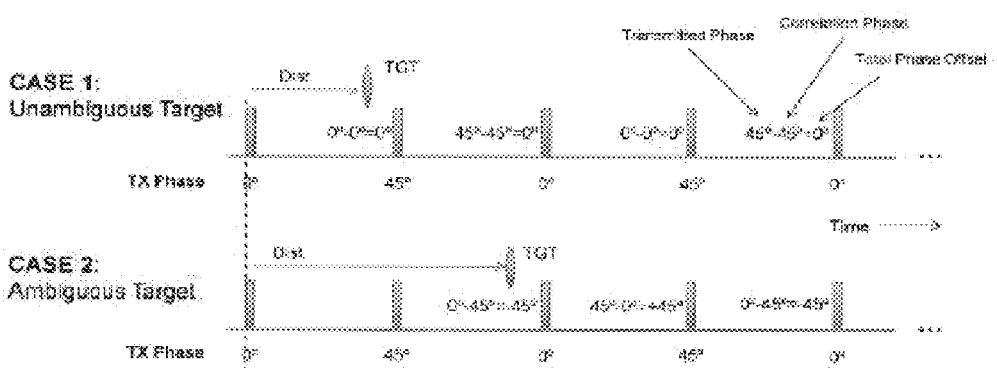
FIG. 9 is a schematic illustration showing the implementation of the system and method, according to an embodiment of the present invention.
Figure 10:
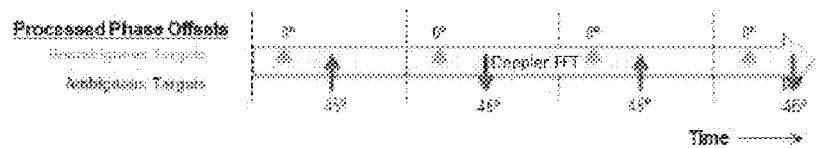
FIG. 10 is a schematic illustration showing the implementation of the system and method, according to an embodiment of the present invention.

Turning to FIG. 9, a schematic illustration of the implementation of the system and method is set forth, according to an embodiment of the present invention. In brief, this figure Shows what is actually happening to provide the additional image response ½ a Doppler window away with reference to the ambiguous target as compared to the unambiguous target. With respect to "case 1—unambiguous target," when the received signal is demodulated with the same transmitted phase, the result is offset by 0°. With respect to "case 2—ambiguous target," when the target is demodulated with the phase of the next waveform, the phase is offset +/−45° pulse to pulse. The net 90° phase shift from pulse to pulse creates an additional image response ½ a Doppler window away from the true response equal in amplitude to the first image response. A similar schematic illustration of the processed phased offsets for unambiguous targets and ambiguous targets is shown in FIG. 10.

Figure 11:
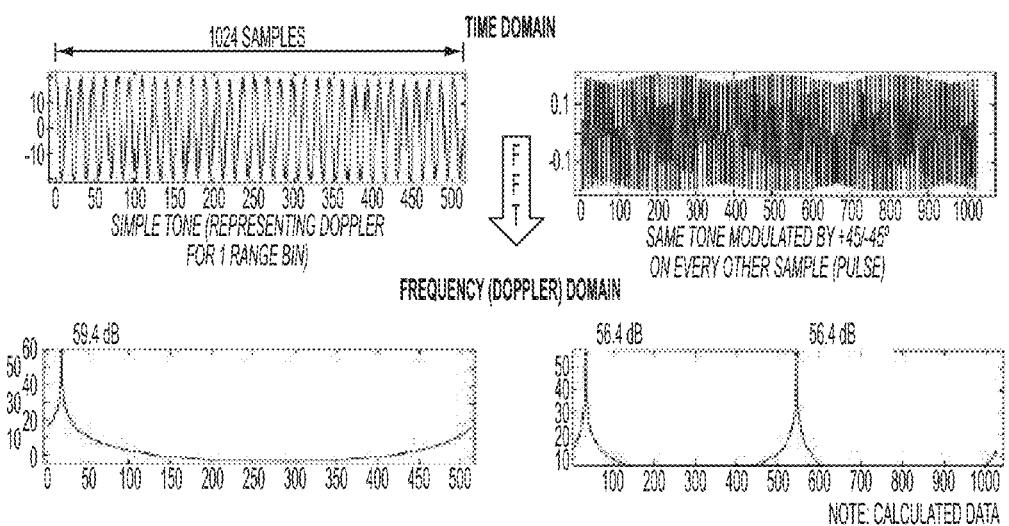
FIG. 11 is a series of graphical illustrations showing the application of the Doppler fast Fourier transform ("FFT"), and that the creation of the Doppler artifact is due to the Doppler processor's FFT.

FIG. 11 is a series of graphical illustrations showing the application of the Doppler fast Fourier transform ("FFT"), and that the creation of the Doppler artifact is due to the Doppler processor's FFT.

In accordance with an embodiment of the present invention, using waveforms with an alternating phase where the phase offset is between 0 and 45 degrees can still create a second target response. A second response can again be created ½ a Doppler window away. The true response will be larger in amplitude that its image. This allows the target's true Doppler to be identified, and the target information can then be utilized.

Some phases may cause only a single response. For example, alternating phases at 90 degrees causes the Doppler response to shift by ½ the Doppler window. Alternating phases between 45 and 90 degrees causes a similar affect. The smallest response now has the correct Doppler value. Other values above 90 degrees revert to one of the above cases.

Figure 12:
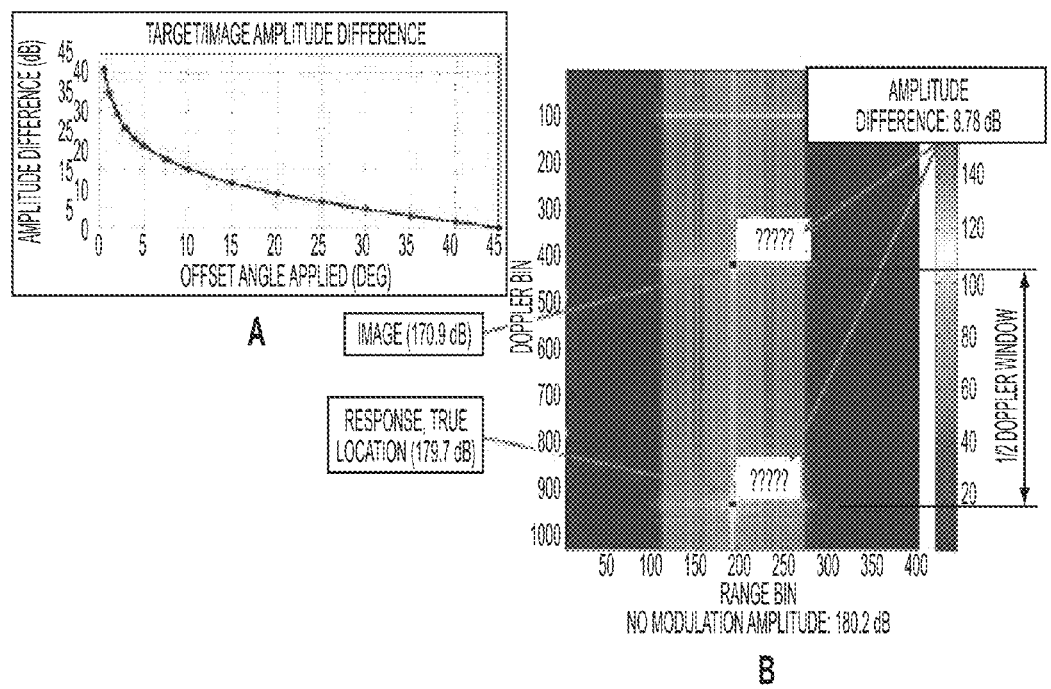
FIG. 12A-B is a graphical illustration and a Range-Doppler image, respectively, showing the results of an example using 0 and 20 degrees alternating phases which illustrates that the value of the alternating phase is not restricted to 45 degrees, according to an embodiment of the present invention.

FIG. 12A-B is a graphical illustration showing the difference in amplitude between the target response and the artifact or image response as a function of the phase offset between transmitted pulses. FIG. 12B is a Range-Doppler image showing the results of an example using 0 and 20 degrees alternating phases, according to an embodiment of the present invention. FIG. 12 shows that an ambiguous target can be identified by the presence of the artifact response. The correct Doppler frequency can be determined by the larger response.

Figure 13:
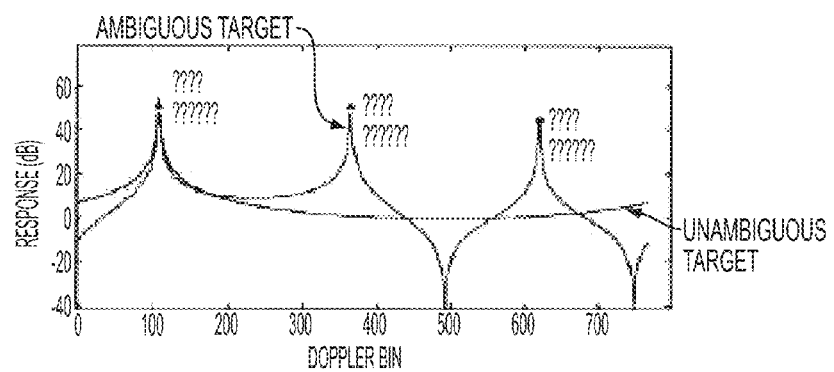
FIG. 13 is a graphical illustration showing three peaks are produced when the target is ambiguous, and a single peak is produced with the target is unambiguous, which illustrates that the number of cycles used for the phase sequence is not restricted to two, according to an embodiment of the present invention.

In accordance with an embodiment of the present invention, it is possible to use a sequence of N phase shifts to separate targets from N different zones. For example, the following sequence of waveform phase shifts of 0, 60, and 120 degrees can be utilized to cover one unambiguous and two ambiguous zones, respectively. As shown in FIG. 13, three peaks are produced when the target is ambiguous, and a single peak is produced with the target is unambiguous.

A "module," as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, completely or partly on the thermal printer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more of the Figures illustrate the architecture, functionality, and/or operation of possible implementations of systems, methods, and computer program products according to various embodiments of the present invention. In this regard, each Figure may represent a module, segment, or portion of code, which comprises instructions for implementing the specified logical function(s). It should also be noted that, in some alternative implementations, the functions noted/illustrated in the Figures may occur out of the order noted in the figures, substantially concurrently, or in the reverse order, depending upon the functionality involved. It will also be noted that the functionality shown in the Figures can be implemented by special purpose hardware-based systems that perform the specified functions or acts, or combinations of special purpose hardware and computer instructions.

While several embodiments of the invention have been discussed, it will be appreciated by those skilled in the art that various modifications and variations of the present invention are possible. Such modifications do not depart from the spirit and scope of the present invention.

What is claimed is:

1. A method for identifying and eliminating second time-around ambiguous targets, the method comprising:
   transmitting a first linear FM radar ("LFM") pulse waveform signal and a second LFM pulse waveform signal to at least one target, wherein said first LFM pulse waveform signal and said second LFM pulse waveform signal have alternating phase shifts separated by a predetermined degree;
   receiving a first return signal from said at least one target in response to said first LFM pulse waveform signal, and a second return signal from said at least one target in response to said second LFM pulse waveform signal;
   demodulating, by a processor, said received first return signal and said received second return signal;
   identifying said at least one target as a second time-around ambiguous target wherein at least one of the following occurs:
      said received first return signal is demodulated in the step of demodulating in a phase shift that is offset from the transmitted phase shift of said first LFM pulse waveform signal; or
      said received second return signal is demodulated in the step of demodulating in a phase shift that is offset from the transmitted phase shift of said second LFM pulse waveform signal.

2. The method of claim 1, wherein said predetermined degree is between 0 and 90 degrees.

3. The method of claim 1, wherein said predetermined degree is between 45 and 90 degrees.

4. The method of claim 1, wherein said predetermined degree is between 0 and 60 degrees.

5. The method of claim 1, wherein said predetermined degree is between 0 and 45 degrees.

6. The method of claim 5, wherein the step of identifying further comprises the step of examining a Doppler window for and identifying a first Doppler response and a second Doppler response related to said target.

7. The method of claim 6, wherein said first Doppler response and said second Doppler response are separated by about ½ Doppler window at the same range.

8. The method of claim 7, wherein said second Doppler response has an amplitude that is the same as an amplitude of said first Doppler response.

9. The method of claim 8, further comprising the step of eliminating said first Doppler response and said second Doppler response.

10. The method of claim 9, wherein the step of eliminating further comprises application of a software filter to eliminate said first Doppler response and said second Doppler response.

11. A non-transitory computer-readable storage medium containing program code comprising:
    program code for demodulating a received first return signal and a received second return signal, wherein said first return signal is returned from at least one target in response to a first linear FM radar ("LFM") pulse waveform signal and said second return is returned from at least one target in response to a second LFM pulse waveform signal, wherein said first LFM pulse waveform signal and said second LFM pulse waveform signal have alternating phase shifts separated by a predetermined degree;
    program code for identifying said at least one target as a second time-around ambiguous target wherein at least one of the following occurs:
       said received first return signal is demodulated in the step of demodulating in a phase shift that is offset from the transmitted phase shift of said first LFM pulse waveform signal; or
       said received second return signal is demodulated in the step of demodulating in a phase shift that is offset from the transmitted phase shift of said second LFM pulse waveform signal.

12. The non-transitory computer-readable storage medium of claim 11, wherein said predetermined degree is between 0 and 90 degrees.

13. The non-transitory computer-readable storage medium of claim 11, wherein said predetermined degree is between 45 and 90 degrees.

14. The non-transitory computer-readable storage medium of claim 11, wherein said predetermined degree is between 0 and 60 degrees.

15. The non-transitory computer-readable storage medium of claim 11, wherein said predetermined degree is between 0 and 45 degrees.

16. The non-transitory computer-readable storage medium of claim 15, further comprising program code for examining a Doppler window for and identifying a first Doppler response and a second Doppler response related to said target.

17. The non-transitory computer-readable storage medium of claim 16, wherein said first Doppler response and said second Doppler response are separated by about ½ Doppler window at about the same range.

18. The non-transitory computer-readable storage medium of claim 17, wherein said second Doppler response has an amplitude that is the same as an amplitude of said first Doppler response.

19. The non-transitory computer-readable storage medium of claim 18, further comprising program code for eliminating said first Doppler response and said second Doppler response.

20. The non-transitory computer-readable storage medium of claim 19, wherein the program code for eliminating further comprises program code for applying a software filter to eliminate said first Doppler response and said second Doppler response.

* * * * *